US010970515B2

(12) United States Patent
Jin et al.

(10) Patent No.: US 10,970,515 B2
(45) Date of Patent: Apr. 6, 2021

(54) METHOD AND ELECTRONIC DEVICE FOR VERIFYING FINGERPRINT

(71) Applicant: SAMSUNG ELECTRONICS CO., LTD., Suwon-si (KR)

(72) Inventors: Yunjang Jin, Yongin-si (KR); Kyunghoon Song, Yongin-si (KR); Kwangsub Lee, Yongin-si (KR); Seyoung Jang, Seongnam-si (KR); Chihyun Cho, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 162 days.

(21) Appl. No.: 15/429,537

(22) Filed: Feb. 10, 2017

(65) Prior Publication Data

US 2017/0235998 A1     Aug. 17, 2017

(30) Foreign Application Priority Data

Feb. 12, 2016 (KR) .......................... 10-2016-0016190

(51) Int. Cl.
G06K 9/00 (2006.01)
(52) U.S. Cl.
CPC ..... G06K 9/00087 (2013.01); G06K 9/00013 (2013.01)
(58) Field of Classification Search
CPC ........... G06K 9/00087; G06K 9/00013; G06K 9/00006–0012
USPC ................................................ 382/124, 125
See application file for complete search history.

(56) References Cited

U.S. PATENT DOCUMENTS

| 2005/0069179 | A1* | 3/2005 | Hwang | G06K 9/0008 382/124 |
| 2006/0120575 | A1* | 6/2006 | Ahn | G06K 9/00006 382/124 |
| 2006/0285729 | A1 | 12/2006 | Kim et al. | |
| 2007/0036401 | A1* | 2/2007 | Hara | G06K 9/00073 382/125 |
| 2013/0121542 | A1* | 5/2013 | Gozzini | G06K 9/0012 382/124 |
| 2014/0020090 | A1* | 1/2014 | Nada | G06K 9/036 726/19 |
| 2014/0294259 | A1* | 10/2014 | Lee | G06K 9/00013 382/124 |

(Continued)

Primary Examiner — Wesley J Tucker
(74) Attorney, Agent, or Firm — Nixon & Vanderhye P.C.

(57) ABSTRACT

According to various embodiments, an electronic device includes: a housing; a display exposed through a part of the housing and located within the housing; a fingerprint sensor located at a portion of the housing and coupled with the display; a processor electrically coupled with the display and the fingerprint sensor; and at least one memory electrically coupled with the processor, wherein the memory stores fingerprint data for confirmation and stores instructions to be executed by the processor and the instructions that, when executed, cause the processor to receive the fingerprint data of a user using the fingerprint sensor, to analyze the received fingerprint data to determine whether at least a part of the fingerprint data is a result of at least a part of the finger at least partially covered with an external material, and to at least partially compare a part of the stored fingerprint data for confirmation with the analyzed fingerprint data.

18 Claims, 14 Drawing Sheets

VALID REGION:100%
⟨1010⟩

VALID REGION:80%
⟨1020⟩

VALID REGION:50%
⟨1030⟩

(56) References Cited

U.S. PATENT DOCUMENTS

2015/0067827 A1\* 3/2015 Lim ........................ G06F 21/32
726/19

\* cited by examiner

METHOD AND ELECTRONIC DEVICE FOR VERIFYING FINGERPRINT

CROSS-REFERENCE TO RELATED APPLICATION

This application is based on and claims priority under 35 U.S.C. § 119 to a Korean patent application filed on Feb. 12, 2016 in the Korean Intellectual Property Office and assigned Serial number 10-2016-0016190, the disclosure of which is incorporated by reference herein in its entirety.

TECHNICAL FIELD

The present disclosure relates generally to a method and an electronic device for verifying a fingerprint.

BACKGROUND

An electronic device may have a communication function and have various functions besides the communication function. The electronic device stores location information of a user, a game that a user enjoys, web surfing that a user often visits, photograph shooting, an important memo, and financial transactions information in addition to data such as contacts, a call history, and a message. Further, the electronic device may use the stored information to perform various communication functions. Accordingly, the electronic device may perform various functions by its own multiple function but stores privacy information, etc., and therefore may be vulnerable to exposure of privacy, personal information leak, security, etc.

Therefore, the current electronic devices may have various security functions for protection of personal information and may have a fingerprint verifying function among security functions. The fingerprint verifying function may improve the security of the electronic device using a fingerprint that is biometric information of a user. The fingerprint of the user is unique information, and therefore is little likely to be the same as that of other persons. As a result, the fingerprint verifying function may have more excellent security performance than other security means (for example, password authentication, pattern authentication).

The electronic device supports only the fingerprint verifying function, but the accuracy in the fingerprint verification rate thereof may be reduced. For example, when a fingerprint sensor is stained with foreign substances, the fingerprint verification rate of the electronic device may be remarkably reduced.

SUMMARY

Accordingly, various example embodiments of the present disclosure provide a method and a device for increasing accuracy in fingerprint verification even though a fingerprint sensor may be stained with foreign substances.

Further, various example embodiments of the present disclosure may provide a method and a device for providing feedback (for example, alarm, vibration, pop up, etc.) when a fingerprint is stained with foreign substances.

Various example embodiments of the present disclosure provide an electronic device comprising: a housing; a display exposed through a part of the housing and disposed within the housing; a fingerprint sensor disposed at a portion of the housing and coupled with the display; a processor electrically coupled with the display and the fingerprint sensor; and at least one memory electrically coupled with the processor, in which the memory stores fingerprint data for confirmation and stores instructions, wherein the processor is configured to execute the instructions to receive the fingerprint data of a user using the fingerprint sensor, to analyze the fingerprint data to determine whether at least a part of the received fingerprint data is due to the fingerprint being at least partially covered with an external material, and to compare a part of stored fingerprint data for confirmation with the analyzed fingerprint data.

Various example embodiments of the present disclosure provide a method for verifying a fingerprint comprising: receiving fingerprint data of a user using a fingerprint sensor; analyzing the received fingerprint data to determine whether at least a part of the received fingerprint data is due to the fingerprint being at least partially covered with an external material; and comparing a part of the fingerprint data for confirmation with the analyzed fingerprint data.

BRIEF DESCRIPTION OF THE DRAWINGS

The above an other aspects, features and attendant advantages of the present disclosure will be more easily understood and readily appreciated from the following detailed description, taken in conjunction with the accompanying drawings, in which like reference numerals refer to like elements, and wherein.

DETAILED DESCRIPTION

Figure 1:
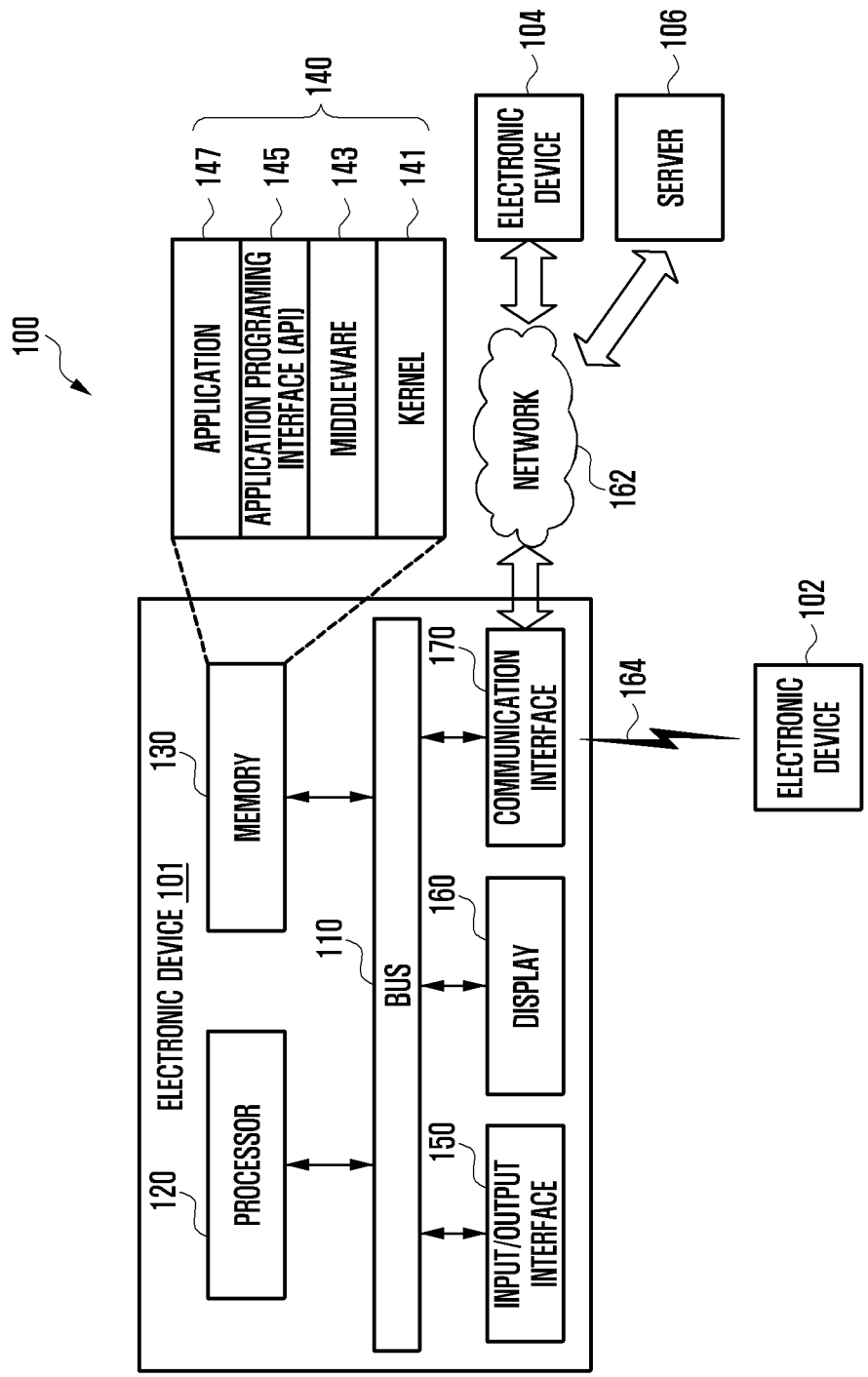
FIG. 1 is a diagram illustrating an example network environment including an electronic device according to various example embodiments of the present disclosure.

Hereinafter, various example embodiments of the present disclosure are described with reference to the accompanying drawings. Although specific embodiments are illustrated in the drawings and related detailed descriptions are discussed in the present disclosure, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

In various embodiments of the present disclosure, the terms such as "include", "have", "may include" or "may have" may be understood to denote a certain characteristic, number, step, operation, constituent element, component or a combination thereof, but may not be understood to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "(operatively or communicatively) coupled to" or "connected to" another component, the component may be directly coupled or connected to another component or a new component may exist between the component and another component. On the other hand, when it is stated that a component is "directly coupled to" or "directly connected to" another component, a new component does not exist between the component and another component. In the present disclosure, the expression "configured (or set) to do" may be used interchangeably with, for example, "suitable for doing," "having the capacity to do," "designed to do," "adapted to do," "made to do," or "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer, for example, to a dedicated processor (e.g., an embedded processor) or a generic-purpose processor (e.g., CPU or application processor) that may execute one or more software programs stored in a memory device to perform corresponding functions.

An electronic device according to various embodiments of the present disclosure may be a device including an antenna. For example, the electronic device may be one or more of the following: a smart phone, a tablet Personal Computer (PC), a mobile phone, a video phone, an e-book reader, a desktop PC, a laptop PC, a netbook computer, a Personal Digital Assistant (PDA), Portable Multimedia Player (PMP), MP3 player, a mobile medical application, a camera, and a wearable device (for example, a Head-Mounted-Device (HMD), such as electronic glasses, electronic clothes, an electronic bracelet, an electronic necklace, an electronic appcessary, an electronic tattoo, and a smart watch), or the like, but is not limited thereto.

According to some embodiments, the electronic device may be a smart home appliance having an antenna. The smart home appliance may include at least one of the following: a Television (TV), a Digital Video Disk (DVD) player, an audio player, an air conditioner, a cleaner, an oven, a microwave oven, a washing machine, an air purifier, a set-top box, a TV box (for example, Samsung Home-Sync™, Apple TV™, or Google TV™), game consoles, an electronic dictionary, an electronic key, a camcorder, and an electronic frame, or the like, but is not limited thereto.

According to some embodiments, the electronic device may include at least one of the following: various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops, or the like, but is not limited thereto.

According to some embodiments, the electronic device may include at least one of the following: furniture or a part of a building/structure, an electronic board, an electronic signature receiving device, a projector, and various types of measuring devices (for example, a water meter, an electricity meter, a gas meter, a radio wave meter and the like), or the like, but is not limited thereto. The electronic device according to various embodiments of the present disclosure may also be a combination of the devices listed above. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments will be discussed with reference to the accompanying drawings. The term se skilled in the art that the electronic device according to various embodiments of the present meter and the e (e.g., an artificial intelligence electronic device) using an electronic device.

FIG. 1 is a diagram illustrating an example network environment 100 including an electronic device 101 according to various example embodiments of the present disclosure. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. According to some embodiments, at least one of the above described components may be omitted from the electronic device 101 or another component may be further included in the electronic device 101.

The bus 110 may be a circuit connecting the above described components 120, 130, and 150~170 and transmitting communications (e.g., control messages and/or data) between the above described components.

The processor 120 may include various processing circuitry, such as, for example, and without limitation, one or more of the following: a dedicated processor, a central processing unit (CPU), an application processor (AP), and a communication processor (CP). The processor 120 is capable of controlling at least one of other components of the electronic device 101 and/or processing data or operations related to communication.

The memory 130 is capable of including volatile memory and/or non-volatile memory. The memory 130 is capable of storing data or commands related to at least one of other components of the electronic device 101. According to an embodiment, the memory 130 is capable of storing software and/or a program module 140. For example, the program module 140 is capable of including a kernel 141, middleware 143, application programming interface (API) 145, application programs (or applications) 147, etc. The kernel 141, middleware 143 or at least part of the API 145 may be called an operating system (OS).

The kernel 141 is capable of controlling or managing system resources (e.g., the bus 110, processor 120, memory 130, etc.) used to execute operations or functions of other programs (e.g., the middleware 143, API 145, and application programs 147). The kernel 141 provides an interface capable of allowing the middleware 143, API 145, and application programs 147 to access and control/manage the individual components of the electronic device 101.

The middleware 143 is capable of mediating between the API 145 or application programs 147 and the kernel 141 so that the API 145 or the application programs 147 can communicate with the kernel 141 and exchange data therewith. The middleware 143 is capable of processing one or more task requests received from the application programs 147 according to the priority. For example, the middleware 143 is capable of assigning a priority for use of system resources of the electronic device 101 (e.g., the bus 110, processor 120, memory 130, etc.) to at least one of the application programs 147. For example, the middleware 143 processes one or more task requests according to a priority assigned to at least one application program, thereby performing scheduling or load balancing for the task requests.

The API 145 refers to an interface configured to allow the application programs 147 to control functions provided by the kernel 141 or the middleware 143. The API 145 is capable of including at least one interface or function (e.g., instructions) for file control, window control, image process, text control, or the like.

The input/output interface 150 may include various input/output circuitry and is capable of transferring instructions or data, received from the user or external devices, to one or more components of the electronic device 101. The input/output interface 150 is capable of outputting instructions or data, received from one or more components of the electronic device 101, to the user or external devices.

The display 160 is capable of including a Liquid Crystal Display (LCD), a flexible display, a transparent display, a Light Emitting Diode (LED) display, an Organic Light Emitting Diode (OLED) display, Micro-Electro-Mechanical Systems (MEMS) display, an electronic paper display, or the like, but is not limited thereto. The display 160 is capable of displaying various types of content (e.g., texts, images, videos, icons, symbols, etc.). The display 160 may also be implemented with a touch screen. In this case, the display 160 is capable of receiving touches, gestures, proximity inputs or hovering inputs, via a stylus pen, or a user's body.

The communication interface 170 may include various communication circuitry and is capable of establishing communication between the electronic device 101 and an external device (e.g., a first external device 102, a second electronic device 104, or a server 106). For example, the communication interface 170 is capable of communicating with an external device (e.g., a second external device 104 or a server 106) connected to the network 162 via wired or wireless communication.

Wireless communication may employ, as cellular communication protocol, at least one of the following: long-term evolution (LTE), LTE Advance (LTE-A), code division multiple access (CDMA), wideband CDMA (WCDMA), universal mobile telecommunications system (UMTS), Wireless Broadband (WiBro), and Global System for Mobile Communication (GSM). Wireless communication may also include short-range wireless communication 164. Short-range wireless communication 164 may include at least one of the following: wireless fidelity (WiFi), Bluetooth (BT), near field communication (NFC), Magnetic Secure Transmission (MST), and Global Navigation Satellite System (GNSS). The GNSS may include at least one of the following: Global Positioning System (GPS), Global Navigation Satellite System (Glonass), Beidou Navigation Satellite System (hereinafter called 'Beidou"), Galileo, the European global satellite-based navigation system, according to GNSS using areas, bandwidths, etc. In the present disclosure, "GPS" and "GNSS" may be used interchangeably. Wired communication may include at least one of the following: universal serial bus (USB), high definition multimedia interface (HDMI), recommended standard 232 (RS-232), and plain old telephone service (POTS). The network 162 may include at least one of the following: a telecommunications network, e.g., a computer network (e.g., LAN or WAN), the Internet, and a telephone network.

The first and second external electronic devices 102 and 104 may be each identical to or different from the electronic device 101, in terms of type. According to an embodiment, the server 106 is capable of including a group of one or more servers. According to various embodiments, part or all of the operations executed on the electronic device 101 may be executed on another electronic device or a plurality of other electronic devices (e.g., electronic devices 102 and 104 or a server 106). According to an embodiment, when the electronic device needs to perform a function or service automatically or according to a request, it does not perform the function or service, but is capable of additionally requesting at least part of the function related to the function or service from other electronic device (e.g., electronic devices 102 and 104 or a server 106). The other electronic device (e.g., electronic devices 102 and 104 or a server 106) is capable of executing the requested function or additional functions, and transmitting the result to the electronic device 101. The electronic device 101 processes the received result, or further proceeds with additional processes, to provide the requested function or service. To this end, the electronic device 101 may employ cloud computing, distributed computing, or client-server computing technology.

Figure 2:
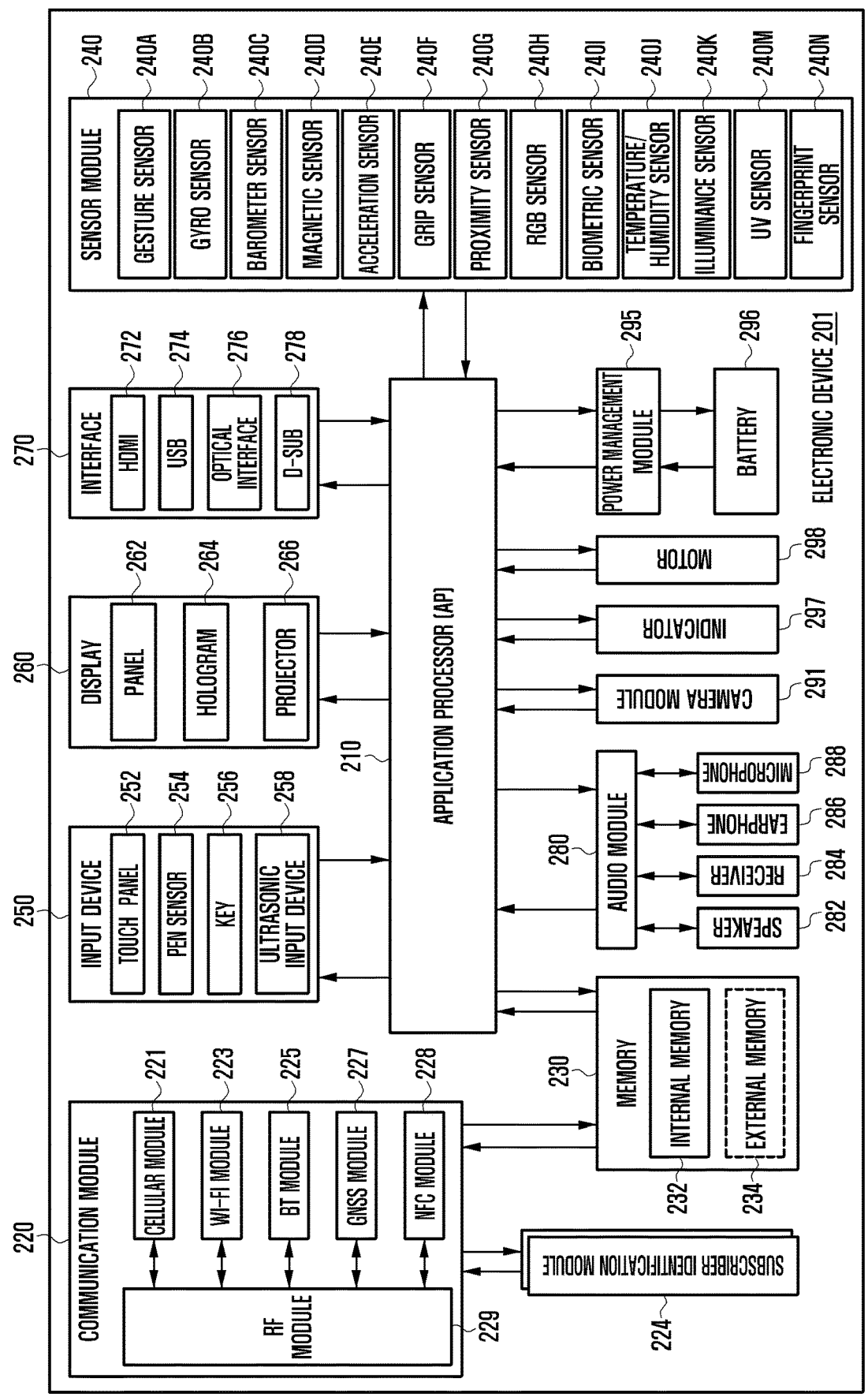
FIG. 2 is a block diagram illustrating an example electronic device according to various example embodiments of the present disclosure.

FIG. 2 is a block diagram illustrating an example configuration of an electronic device 201 according to various example embodiments of the present disclosure. For example, the electronic device 201 is capable of including part or all of the components in the electronic device 101 illustrated in FIG. 1. The electronic device 201 is capable of including one or more processors (e.g., including processing circuitry) 210 (e.g., Application Processors (APs)), a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and is capable of driving, for example, an operating system or an application program to control a plurality of hardware or software components connected to the processor 210, processing various data, and performing operations. The processor 210 may be implemented as, for example, a System on Chip (SoC). According to an embodiment, the processor 210 may further include a graphic processing unit (GPU) and/or an image signal processor. The processor 210 may also include at least part of the components illustrated in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 illustrated in FIG. 1. For example, the communication module 170 may include various processing circuitry, such as, for example, and without limitation, a cellular module 221, WiFi module 223, Bluetooth (BT) module 225, GNSS module 227 (e.g., a GPS module, Glonass module, Beidou module or Galileo module), NFC module 228, and Radio Frequency (RF) module 229.

The cellular module 221 is capable of providing a voice call, a video call, an SMS service, an Internet service, etc., through a communication network, for example. According to an embodiment, the cellular module 221 is capable of identifying and authenticating an electronic device 201 in a communication network by using a subscriber identification module (SIM) 224 (e.g., a SIM card). According to an embodiment, the cellular module 221 is capable of performing at least part of the functions provided by the processor 210. According to an embodiment, the cellular module 1721 is also capable of including a communication processor (CP).

Each of the WiFi module 223, the BT module 225, the GNSS module 227, and the NFC module 228 is capable of including a processor for processing data transmitted or received through the corresponding module. According to embodiments, at least part of the cellular module 221, WiFi module 223, BT module 225, GNSS module 227, and NFC module 228 (e.g., two or more modules) may be included in one integrated chip (IC) or one IC package.

The RF module 229 is capable of transmission/reception of communication signals, e.g., RF signals. The RF module 229 is capable of including a transceiver, a power amp module (PAM), a frequency filter, a low noise amplifier (LNA), an antenna, etc. According to another embodiment, at least one of the following modules: cellular module 221, WiFi module 223, BT module 225, GNSS module 227, and NFC module 228 is capable of transmission/reception of RF signals through a separate RF module.

The SIM module 224 is capable of including a card including a subscriber identification module (SIM) and/or an embodied SIM. The SIM module 224 is also capable of containing unique identification information, e.g., integrated circuit card identifier (ICCID), or subscriber information, e.g., international mobile subscriber identity (IMSI).

The memory 230 (e.g., memory 130 shown in FIG. 1) is capable of including a built-in memory 232 and/or an external memory 234. The built-in memory 232 is capable of including at least one of the following: a volatile memory, e.g., a dynamic RAM (DRAM), a static RAM (SRAM), a synchronous dynamic RAM (SDRAM), etc.; and a non-volatile memory, e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc.

The external memory 234 may include a flash drive, for example, compact flash (CF), secure digital (SD), Micro-SD, Mini-SD, extreme digital (xD), a multi media card (MMC), a memory stick, or the like. The external memory 234 may be functionally or physically connected to the electronic device 201 through various interfaces.

According to various example embodiments of the present disclosure, fingerprint information may be stored in the memory 230. The fingerprint information may be unique fingerprint information of a user that is pre-registered by the user of the electronic device 201. The processor 210 of the electronic device 201 may previously acquire and store the fingerprint information of the user to perform a fingerprint verifying function.

The memory 230 according to various embodiments of the present disclosure may store security levels of applications. As the importance of the applications (for example, applications requiring high security) is high, the security levels of the applications may be set to be high and may be information that is set for each application. The security levels of the applications may be set by a user and may also be set by an application developer. The setting associated with the security level of the application is not limited to any one and according to various embodiments of the present disclosure, the security levels each may be differently set per application.

The sensor module 240 may measure, for example a physical amount or sense an operation state of the electronic device 201 to convert the measured or detected information into an electrical signal. The sensor module 240 may include, for example, at least one of a gesture sensor 240A, a gyro sensor 240B, an atmospheric pressure (e.g., barometer) sensor 240C, a magnetic sensor 240D, an acceleration sensor 240E, a grip sensor 240F, a proximity sensor 240G, a color sensor 240H (for example, RGB (red, green, blue) sensor), a biometric sensor 240I, a temperature/humidity sensor 240J, an illumination sensor 240K, an ultraviolet (UV) sensor 240M, or a fingerprint sensor 240N. Additionally or generally, the sensor module 240 may include, for example, an e-nose sensor, an electromyography (EMG) sensor, an electroencephalogram (EEG) sensor, an electrocardiogram (ECG) sensor, an infrared (IR) sensor, and an iris sensor. The sensor module 240 may further include a control circuit for controlling at least one sensor included therein. In any embodiment, the electronic device 201 is a part of the processor 210 or separately may further include a processor configured to control the sensor module 240, such that the processor 210 may control the sensor module 240 while the processor 210 is in a sleep state.

A fingerprint sensor 240N according to various example embodiments of the present disclosure may be one of various sensors that are included in the electronic device 210. The fingerprint sensor 240N may be provided on a surface on which the display 260 is located and may also be included in some region of a location near the display 260. The fingerprint sensor 240N may also be included in the input device 250. The fingerprint sensor 240N according to various embodiments of the present disclosure may be located at a bezel region of a lower portion of the display 260. Further, the fingerprint sensor 240N may also be included in a home key.

The fingerprint sensor 240N may be configured in an optical type or a semiconductor type. The optical type may be a type that projects light onto a platen (for example, panel) and verifies a fingerprint image reflected according to a fingerprint form of a fingertip put on the platen. The semiconductor type may be a type that reads a special shape of a fingerprint contacting a chip surface as an electrical signal when a fingertip directly contacts the chip surface using electric conduction characteristics of a skin and uses biological features. Further, the fingerprint sensor 240N may also be configured in a touch sensor type. In the touch sensor, electrodes may be disposed at an interval smaller than a size and an interval of a valley and a ridge of a fingerprint.

The fingerprint sensor 240N may be configured in a swipe type or a fixed region type. The swipe type is a method for dragging a location of a fingerprint sensor 240N with a finger and is a method for sequentially verifying dragged fingers (for example, fingerprint) by a sensor electrode one-dimensionally or linearly disposed and then synthesizing the verified fingers as a two-dimensional fingerprint image by post-processing. Further, the fixed region type is a type of obtaining a two-dimensional fingerprint image while a finger touches a two-dimensionally disposed sensor. Therefore, in the touch sensor for verifying a fingerprint, the electrodes need to be disposed one-dimensionally or two-dimensionally.

In the electronic device according to various example embodiments of the present disclosure, an installation location of the fingerprint sensor 240N may be a lower portion of the display 260 and a fingerprint verifying type may be a swipe type and may be installed on a home button (lower portion of the display 260). Meanwhile, the fingerprint sensor 240N may be at any location near the display 260 and the fingerprint verifying type may also be the fixed region type and the fingerprint sensor 240N may also be at any location in the bezel region of the display 260, besides at the home button. If the fingerprint sensor 240N is a touch sensor type fingerprint sensor, the fingerprint sensor 240N may be at any location of the input device 250 located at the lower portion of the display 260.

The input device 250 may include various input circuitry, such as, for example, and without limitation, a touch panel 252, a (digital) pen sensor 254, a key 256, or an ultrasonic input unit 258. The touch panel 252 may be implemented with at least one of the following: a capacitive touch system, a resistive touch system, an infrared touch system, and an ultrasonic touch system. The touch panel 252 may further include a control circuit. The touch panel 252 may also further include a tactile layer to provide a tactile response to the user.

The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 (e.g., the display 160 shown in FIG. 1) is capable of including a panel 262, a hologram unit 264, or a projector 266. The panel 262 may include the same or similar configurations as the display 160 illustrated in FIG. 1. The panel 262 may be implemented to be flexible, transparent, or wearable. The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. According to an example embodiment, the display 260 may further include a control circuit for controlling the panel 262, the hologram unit 264, or the projector 266.

The electronic device 201 according to various example embodiments of the present disclosure may display the configured screen on the display 260 when the sensed fingerprint is confirmed as a user's fingerprint stored in the memory 230. For example, when the sensed fingerprint is confirmed as the user's fingerprint stored in the memory 230 in the state in which the lock screen is displayed on the display 260, the electronic device 201 may unlock the lock screen and display the home screen.

The interface 270 may include various interface circuitry, such as, for example, and without limitation, a high-definition multimedia interface (HDMI) 272, a universal serial bus (USB) 274, an optical interface 276, or a D-subminiature (D-sub) 278. The interface 270 may be included in the communication interface 170 shown in FIG. 1. Additionally or alternatively, the interface 270 is capable of including a mobile high-definition link (MHL) interface, a secure digital (SD) card/multimedia card (MMC) interface, or an infrared data association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, microphone 288, etc.

The camera module 291 refers to a device capable of taking both still and moving images. According to an embodiment, the camera module 291 is capable of including one or more image sensors (e.g., a front image sensor or a rear image sensor), a lens, an image signal processor (ISP), a flash (e.g., an LED or xenon lamp), etc.

The power management module 295 is capable of managing power of the electronic device 201. According to an embodiment, the power management module 295 is capable of including a power management integrated circuit (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge is capable of measuring the residual capacity, charge in voltage, current, or temperature of the battery 296. The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. Although not shown, the electronic device 201 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

According to an example embodiment of the present disclosure, the processor 210 may verify the fingerprint by the fingerprint sensor 240N and perform image processing on the verified fingerprint. For example, the processor 210 may block the image processed fingerprint into a plurality of blocks and perform a black/white processing operation on each block. The processor 210 may perform an operation of determining whether each block is a valid region or is a disregarded block based on information obtained by the black/white processing operation. For example, the processor 210 may perform the fingerprint verifying function by comparing the fingerprint corresponding to the block determined as the valid region with the fingerprint information stored in the memory 230.

According to another example embodiment of the present disclosure, the processor 210 may use the fingerprint sensor 240N to verify a fingerprint including black/white information. For example, the processor 210 may verify data already including black/white information (gray scale information, information determining whether each block is a valid region or is a disregarded block). When the fingerprint sensor 240N verifies the data including the black/white information, the processor 210 may group the data based on a pixel. The processor 210 may group the data based on the pixel, instead of performing the blocking operation of the foregoing embodiment and the operation of determining whether each block is a valid region or is a disregarded block on the data including the black/white information. The more detailed description will be provided with reference to FIG. 11 below.

Figure 3:
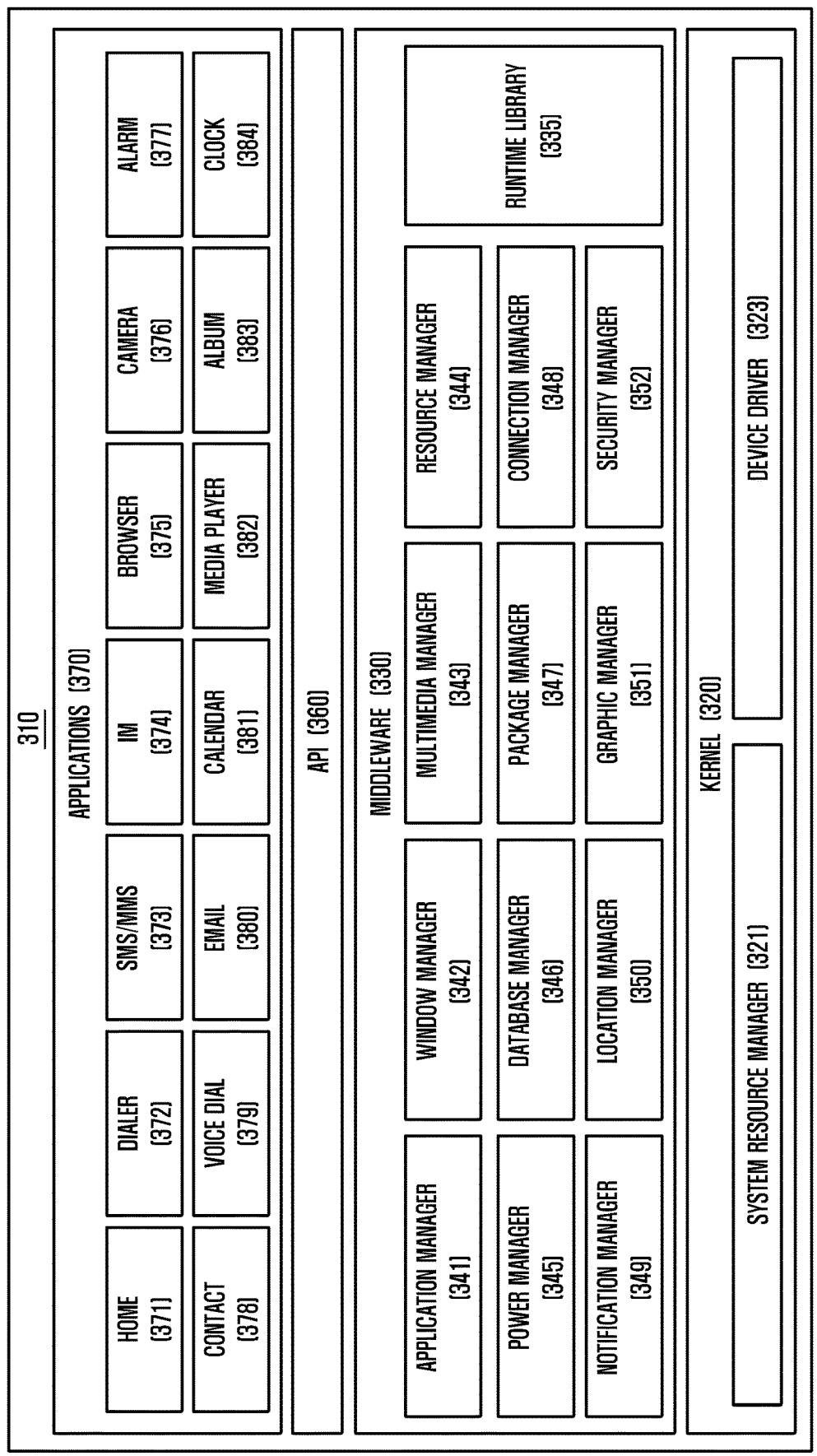
FIG. 3 is a block diagram illustrating an example program module according to various example embodiments of the present disclosure.

FIG. 3 is a block diagram illustrating an example programming module according to various example embodiments of the present disclosure. According to an example embodiment, the program module 310 (e.g., program module 140 illustrated in FIG. 1) is capable of including an operation system (OS) for controlling resources related to the electronic device (e.g., electronic device 101) and/or various applications (e.g., application programs 147 illustrated in FIG. 1) running on the OS. The OS may be Android, iOS, Windows, Symbian, Tizen, Bada, etc.

The program module 310 may include a kernel 320, middleware 330, application programming interface (API) 360 and/or applications 370. At least part of the program module 310 may be preloaded on the electronic device or downloaded from a server (e.g., an electronic device 102 or 104, server 106, etc.).

The kernel 320 (for example, kernel 141) may include a system resource manager 321 and/or a device driver 323. The system resource manager 321 may include, for example, a process manager, a memory manager, and a file system manager. The system resource manager 321 may perform a system resource control, allocation, and recall. The device driver 323 may include, for example, a display driver, a camera driver, a Bluetooth driver, a shared memory driver, a USB driver, a keypad driver, a WiFi driver, and an audio driver. Further, according to an embodiment, the device driver 323 may include an Inter-Process Communication (IPC) driver.

The middleware 330 may provide a function required in common by the applications 370. Further, the middleware 330 may provide a function through the API 360 to allow the applications 370 to efficiently use limited system resources within the electronic device. According to an example embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include, for example, a library module used by a complier to add a new function through a programming language while the applications 370 are executed. According to an embodiment, the runtime library 335 executes input and output, management of a memory, a function associated with an arithmetic function and the like.

The application manager 341 may manage, for example, a life cycle of at least one of the applications 370. The window manager 342 may manage GUI resources used on the screen. The multimedia manager 343 may detect a format required for reproducing various media files and perform an encoding or a decoding of a media file by using a codec suitable for the corresponding format. The resource manager 344 manages resources such as a source code, a memory, or a storage space of at least one of the applications 370.

The power manager 345 may operate together with a Basic Input/Output System (BIOS) to manage a battery or power and provides power information required for the operation. The database manager 346 may manage generation, search, and change of a database to be used by at least one of the applications 370. The package manager 347 may manage an installation or an update of an application distributed in a form of a package file.

The connection manager 348 may manage, for example, a wireless connection such as WiFi or Bluetooth. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface related to the graphic effect. The security manager 352 provides a general security function required for a system security or a user authentication. According to an embodiment, when the electronic device (for example, the electronic device 101) has a call function, the middleware 330 may further include a telephony manager for managing a voice of the electronic device or a video call function.

The middleware 330 is capable of including modules configuring various combinations of functions of the above described components. The middleware 330 is capable of providing modules specialized according to types of operation systems to provide distinct functions. The middleware 330 may be adaptively configured in such a way as to remove part of the existing components or to include new components.

The API 360 (for example, API 145) may be a set of API programming functions, and may be provided with a different configuration according to an operating system. For example, in Android or iOS, a single API set may be provided for each platform. In Tizen, two or more API sets may be provided.

The applications 370 (e.g., application programs 147) may include one or more applications for performing various functions, e.g., home 371, dialer 372, SMS/MMS 373, instant message (IM) 374, browser 375, camera 376, alarm 377, contact 378, voice dial 379, email 380, calendar 381, media player 382, album 383, clock 384, health care (e.g., an application for measuring amount of exercise, blood sugar level, etc.), and environment information (e.g., an application for providing atmospheric pressure, humidity, temperature, etc.).

According to an embodiment, the applications 370 are capable of including an application for supporting information exchange between an electronic device (e.g., electronic device 101) and an external device (e.g., electronic devices 102 and 104), which is hereafter called 'information exchange application'). The information exchange application is capable of including a notification relay application for relaying specific information to external devices or a device management application for managing external devices.

For example, the notification relay application is capable of including a function for relaying notification information, created in other applications of the electronic device (e.g., SMS/MMS application, email application, health care application, environment information application, etc.) to external devices (e.g., electronic devices 102 and 104). In addition, the notification relay application is capable of receiving notification information from external devices to provide the received information to the user.

The device management application is capable of managing (e.g., installing, removing or updating) at least one function of an external device (e.g., electronic devices 102 and 104) communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc.

According to an embodiment, the applications 370 are capable of including an application (e.g., a health care application of a mobile medical device, etc.) specified attributes of an external device (e.g., electronic devices 102 and 104). According to an embodiment, the applications 370 are capable of including applications received from an external device (e.g., a server 106, electronic devices 102 and 104). According to an embodiment, the applications 370 are capable of including a preloaded application or third party applications that can be downloaded from a server. It should be understood that the components of the program module 310 may be called different names according to types of operating systems.

According to various embodiments, at least part of the program module 310 can be implemented with software, firmware, hardware, or any combination of two or more of them. At least part of the program module 310 can be implemented (e.g., executed) by a processor (e.g., processor 210). At least part of the programing module 310 may include modules, programs, routines, sets of instructions or processes, etc., in order to perform one or more functions.

The term "module" used in the present disclosure may include a unit configured in hardware, software, or firmware, or any combination thereof, and may be interchangeably used with terms such as logic, a logic block, a part, and a circuit. The "module" may be an integrally configured part or a minimum unit performing at least one function or a part thereof. The "module" may be mechanically or electronically implemented, and may include, for example, and without limitation, a dedicated processor, a CPU, an application-specific integrated circuit (ASIC) chip, field-programmable gate arrays (FPGAs), a programmable logic device, or the like, which are already known or will be developed in the future, for performing any operations. At least some of the devices (for example: modules or functions thereof) or the methods (for example: operations) according to various embodiments may be implemented as instructions stored in computer-readable storage media (for example: memory 130) in a form of program modules. When the instructions are executed by the processor (for example: processor 120), the processor may perform a function corresponding to the instructions. The computer-readable recording media may include a hard disk, a floppy disk, a magnetic medium (for example: magnetic tape), optical recording media (for example, CD-ROM, DVD, magnetic-optical medium (for example: floptical disk)), an internal memory, or the like. The instructions may include codes made by a compiler or codes that may be executed by an interpreter. The module or the program module according to various embodiments may include at least one of the above-mentioned components, may not include some thereof, or may further include other components. According to various embodiments, the operations executed by the module, the program module, or other components may be performed sequentially, in parallel, repeatedly, or heuristically, at least some operations may be executed in another order or omitted, or other operations may be added.

The electronic device according to various embodiments of the present disclosure includes: a housing; a display exposed through a part of the housing and located within the housing; a fingerprint sensor disposed at a portion of the housing and/or coupled with the display; a processor electrically coupled with the display and the fingerprint sensor; and at least one memory electrically coupled with the processor, in which the memory stores fingerprint data for confirmation and stores commands to be executed by the processor wherein the processor is configured to execute the instructions to receive the fingerprint data of the user using the fingerprint sensor, to analyze the fingerprint data to determine whether at least a part of the received fingerprint data is not usable due to the fingerprint being at least partially covered with external materials, and to compare at least a part of the stored fingerprint data for confirmation with the analyzed fingerprint data.

The external materials according to various embodiments of the present disclosure may include a liquid, in which the liquid may include water.

The instructions of the electronic device according to various embodiments of the present disclosure may include instructions to divide the fingerprint data into a plurality of data sets, determine whether at least one of the plurality of data sets is unusable is due to at least a part of the fingerprint being covered with the external materials, and to compare a plurality of data sets other than at least one data set including the unusable data with the stored fingerprint data for confirmation.

According to various embodiments of the present disclosure, the fingerprint data may include the fingerprint image and the instructions of the electronic device may include instructions to divide the fingerprint image into a plurality of image sections.

According to various embodiments of the present disclosure, the plurality of image sections may be formed in a grid structure.

According to various embodiments of the present disclosure, the memory stores at least one threshold value set by the processor, the instructions may include instructions to determine whether at least one of the plurality of data sets corresponds to the set threshold value or more, and if it is determined that the at least one of the plurality of data sets corresponds to the set threshold value or more, it may be determined that the at least one data set is based on a part of the fingerprint that is at least partially covered with the external materials.

The instructions of the electronic device according to various embodiments of the present disclosure may include instructions to bind at least a part of the image data by pixel to group the image data into a plurality of blocks, depending on whether the data set is based on a part of the fingerprint that is at least partially covered with the external materials.

The instructions of the electronic device according to various embodiments of the present disclosure may include instructions to generate histograms for the at least one data set, respectively, in determining whether the at least one of the plurality of data sets is based on a part of the fingerprint that is at least partially covered with the external materials.

The instructions of the electronic device according to various embodiments of the present disclosure may include instructions to set a plurality of security levels based on applications stored in the memory and determine the set security level based on an area ratio occupied by a part of the fingerprint data that may be used to confirm a fingerprint in the image data.

The instructions of the electronic device according to various embodiments of the present disclosure may include instructions to execute functions of applications corresponding to the security level.

The instructions of the electronic device according to various embodiments of the present disclosure may include instructions to remove the black/white operation on the fingerprint data when the black/white information is included in the fingerprint data.

Figure 4A:
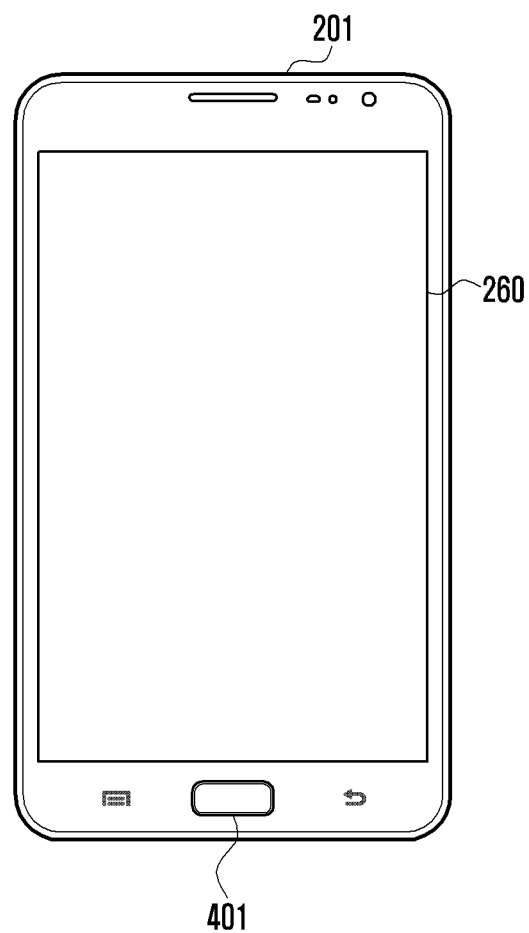
FIGS. 4A and 4B are diagrams illustrating an example home button that may verify a fingerprint in the electronic device according to various example embodiments of the present disclosure.
Figure 4B:
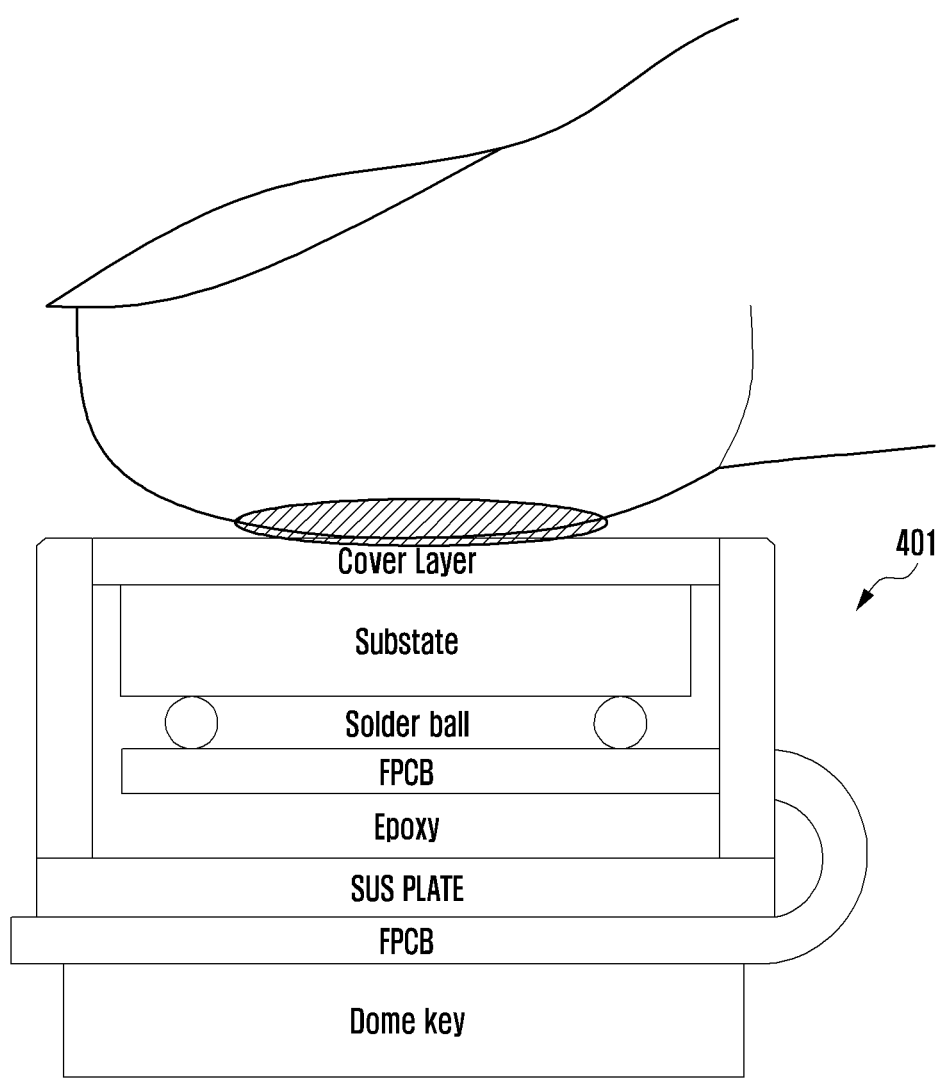

FIGS. 4A and 4B are diagrams illustrating an example home button that may be used to verify a fingerprint in the electronic device according to various example embodiments of the present disclosure.

Referring to FIG. 4A, the electronic device 201 may include the display 260, in which the lower portion of the display 260 may be provided with a home button 401. The home button 401 may be included in an input device (input device 250 of FIG. 2) of the electronic device 201. The home button 401 may include the fingerprint sensor (fingerprint 240N of FIG. 2). The fingerprint sensor may also be included in the home button 401 and may also be included in the bezel of the lower portion of the display 260. The processor 210 of the electronic device 201 may sense a user contact to the home button 401 and verify a user's fingerprint contacting the home button 401.

FIG. 4B is a diagram illustrating an example stacked home button 401 that is included in the electronic device 201.

The electronic device according to various embodiments of the present disclosure may include the home button 401 having the structure of FIG. 4B and may verify the user's fingerprint using the home button 401.

Figure 5A:
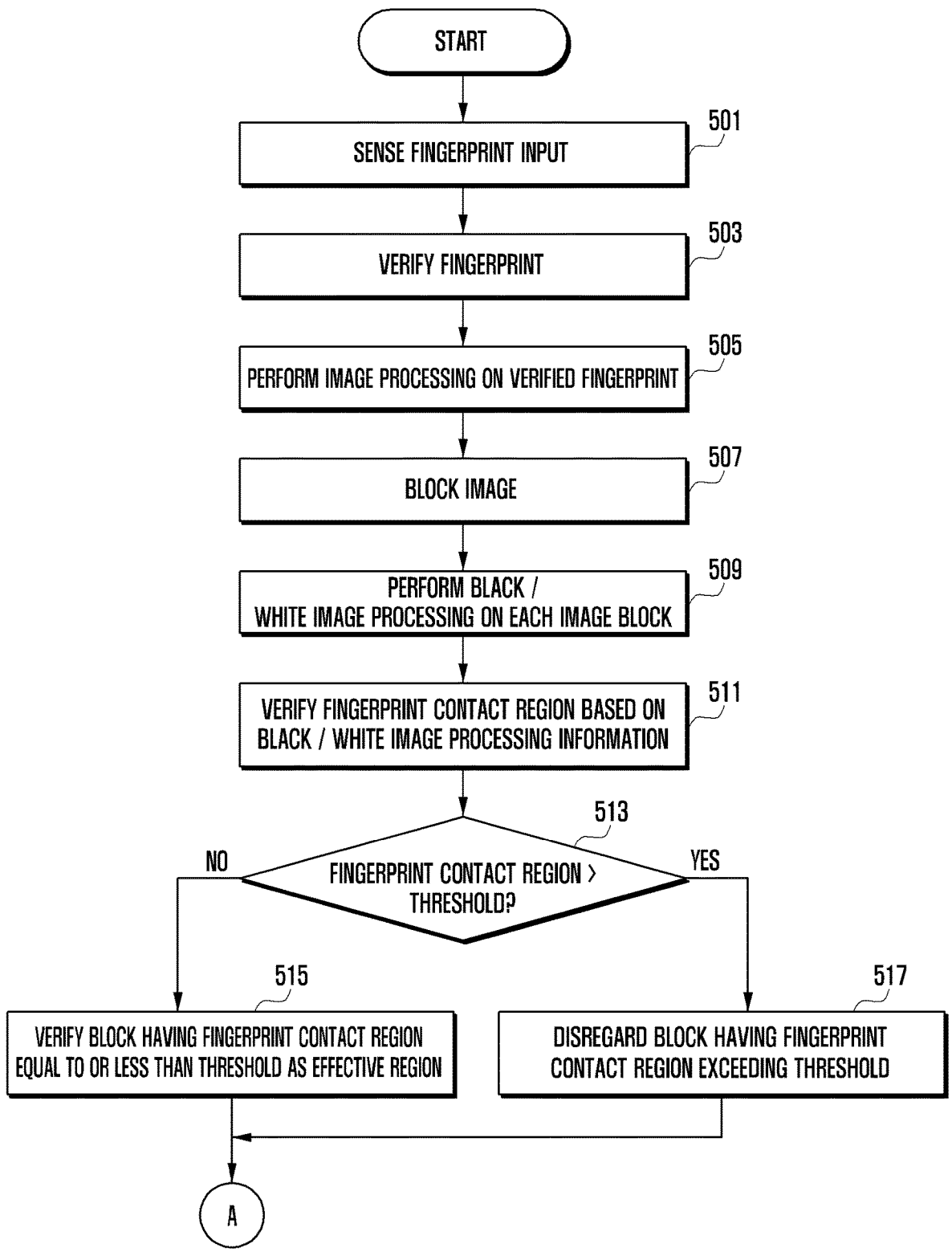
FIGS. 5A and 5B are flowcharts illustrating an example operation of verifying a fingerprint according to various example embodiments of the present disclosure.
Figure 5B:
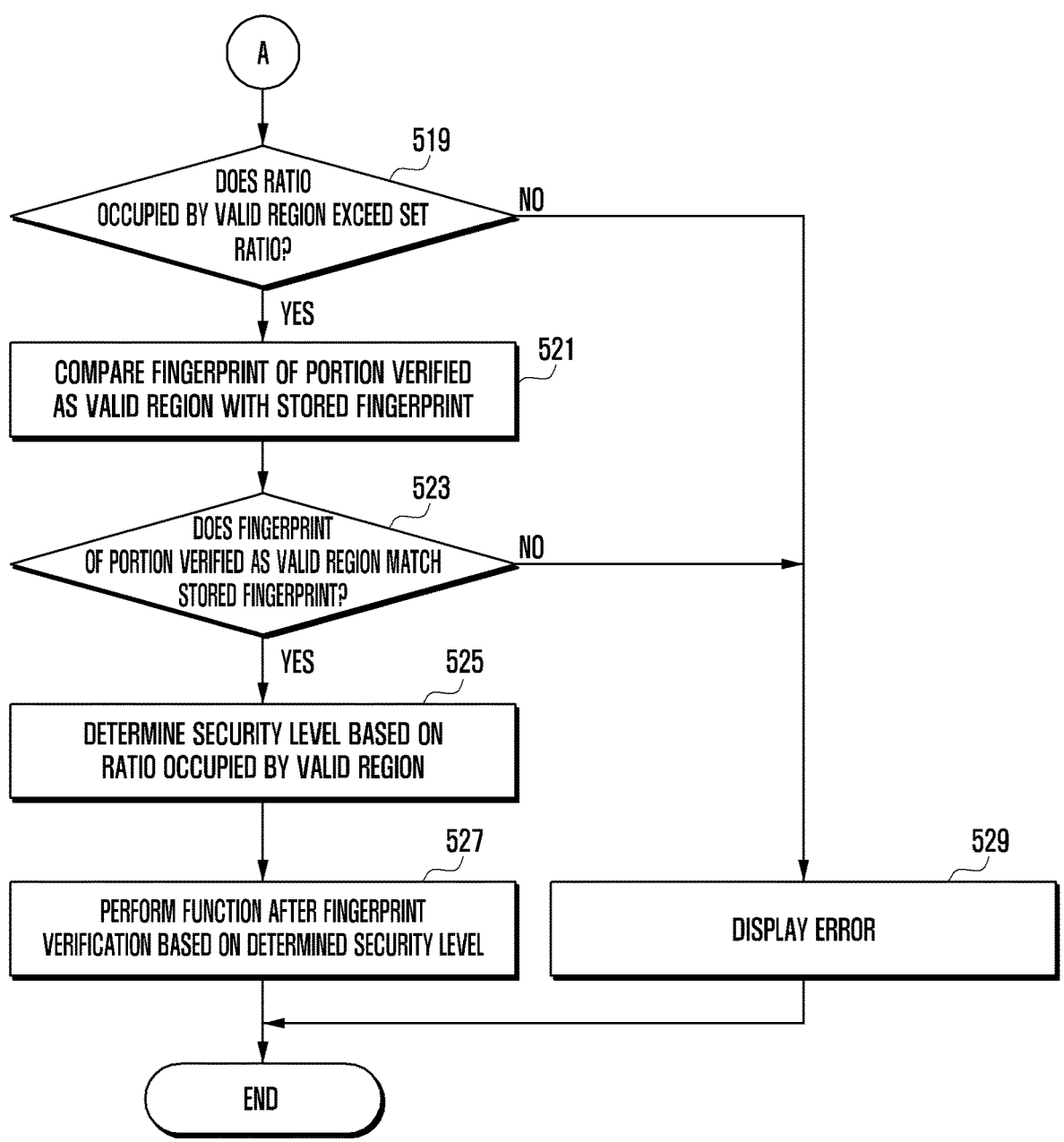

FIGS. 5A and 5B are flowcharts illustrating an example operation of verifying a fingerprint according to various example embodiments of the present disclosure.

Referring first to FIG. 5A, in operation 501, the processor 210 may sense the fingerprint input of the user. The processor 210 may sense the fingerprint input of the user using the fingerprint sensor (fingerprint sensor 240N of FIG. 2).

According to an example embodiment of the present disclosure, the processor 210 may verify a fingerprint in the state in which the display 260 is turned on. The processor 210 may set a specific region (for example, some region of the home button (home key)) in which a fingerprint may be verified and sense the fingerprint input of the user through the set specific region. The state in which the display 260 is turned on may be a state in which the lock screen is displayed as an input event is generated in the specific key (for example, home key).

The processor 210 may verify a fingerprint in operation 503 as the input (for example, fingerprint input) for the fingerprint verification is generated in the specific region of the electronic device. In operation 505, the processor 210 may perform an image processing operation on the verified fingerprint. The image processing operation may convert the fingerprint verified by the fingerprint sensor 240N into an image.

According to another example embodiment of the present disclosure, when the data from which the image processing operation (operation 505) suffers include the black/white information, the processor 210 may group the data based on the pixel, instead of performing operations 507 and 509. The processor 210 may block the image and group the image based on the pixel instead of performing the black/white processing operation on the blocked image. The content associated therewith will be described with reference to FIG. 11.

In the operation 505, when the processor 210 converts the fingerprint into the image, an image correction may be performed to improve accuracy and speed of the fingerprint verification. For example, the image correction may be an operation of noise removal, gain amplification, or the like. The image correction may be performed by the fingerprint sensor 240N as well as the processor 210. The operation of converting the fingerprint into the image will be described with reference to FIG. 6.

Figure 6:
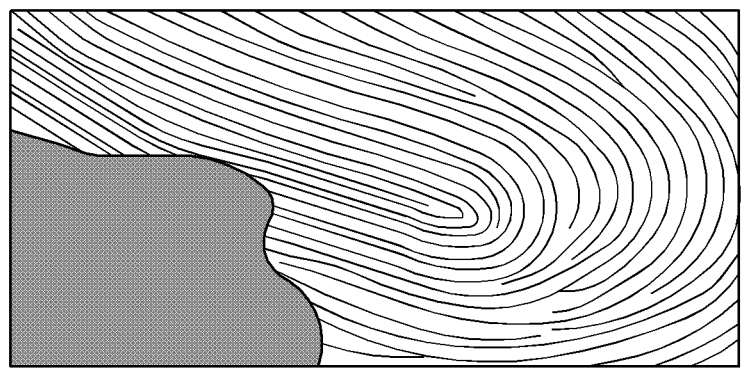
FIGS. 6 and 7 are diagrams illustrating an example operation of verifying a fingerprint according to various example embodiments of the present disclosure.

FIG. 6 is an exemplified diagram of the fingerprint converted into the image according to various embodiments of the present disclosure.

Referring to FIG. 6, the processor 210 may convert the fingerprint verified by the fingerprint sensor 240N into the image. The processor 210 may verify a valley depressed of the fingerprint and a ridge relatively more protruding than the valley using the fingerprint sensor 240N. Since the ridge more protrudes than the valley, the ridge contacts the home key of the electronic device when a user's finger contacts the specific region (for example, home key in which the fingerprint sensor 240N is installed) of the electronic device. Therefore, the fingerprint sensor 240N may confirm regions in which the ridge of the finger contacts the home key as a fingerprint contact region. The processor 210 may verify the fingerprint based on the fingerprint contact region confirmed by the fingerprint sensor 240N and convert the verified fingerprint into the image as illustrated in FIG. 6.

Referring back to FIG. 5A, the processor 210 may block (e.g., divide) the fingerprint image from which the image processing operation (operation 507) suffers into a plurality of blocks. The operation of blocking the fingerprint image will be described with reference to FIG. 7.

Figure 7:
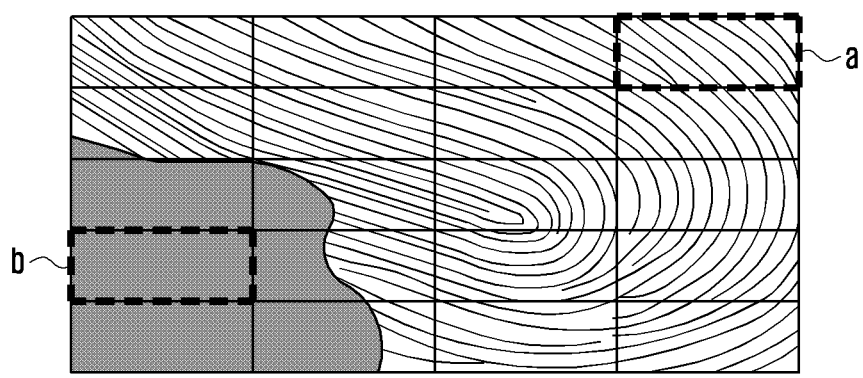

FIG. 7 is a diagram illustrating an example in which the fingerprint image converted into the image according to various example embodiments of the present disclosure is blocked into the plurality of blocks.

Referring to FIG. 7, the processor 210 may block the fingerprint image converted into the image into the plurality of blocks. The processor 210 may compare the fingerprint information stored in the memory 120 with each of the plurality of blocks that are blocked.

Comparing the fingerprint information stored in the memory 230 with each of the plurality of blocks may more accurately verify the fingerprint image than determining whether one fingerprint (for example, the whole sensed fingerprint) matches the stored fingerprint information.

According to various example embodiments of the present disclosure, an area of each block in which the image is blocked may be variable. As the area of each block is reduced, the security may be more improved. For example, as the number of blocks that is blocked is increased, the security may be more improved.

According to an example embodiment of the present disclosure, the processor 210 may variably set the area of each block upon the blocking. For example, when verifying the fingerprint in the state in which the lock screen is displayed on the display 260, the processor 210 may block the fingerprint image in a unit of 5 mm. As another example, when the processor 210 verifies the fingerprint in the state in which it receives a request for executing bank application according to a user request, the processor 210 may block the fingerprint image in a unit of 2 mm. The processor 210 may differently set the area of the blocks that are blocked by application. For example, in connection with the execution of the application requiring the high security, the processor 210 may set the area of blocks to be smaller when performing the fingerprint verification.

Referring back to FIG. 5A, the processor 210 may perform the black/white image processing operation on the respective image blocks that are blocked, in operation 509.

According to various example embodiments of the present disclosure, the black/white image processing operation may be an operation of dividing the fingerprint verified by the fingerprint sensor 240N into white and black depending on a brightness difference and verifying the fingerprint as one image. For example, the black/white image processing operation may be a gray scale. The operation of processing the black/white image will be described with reference to FIG. 8.

Figure 8:
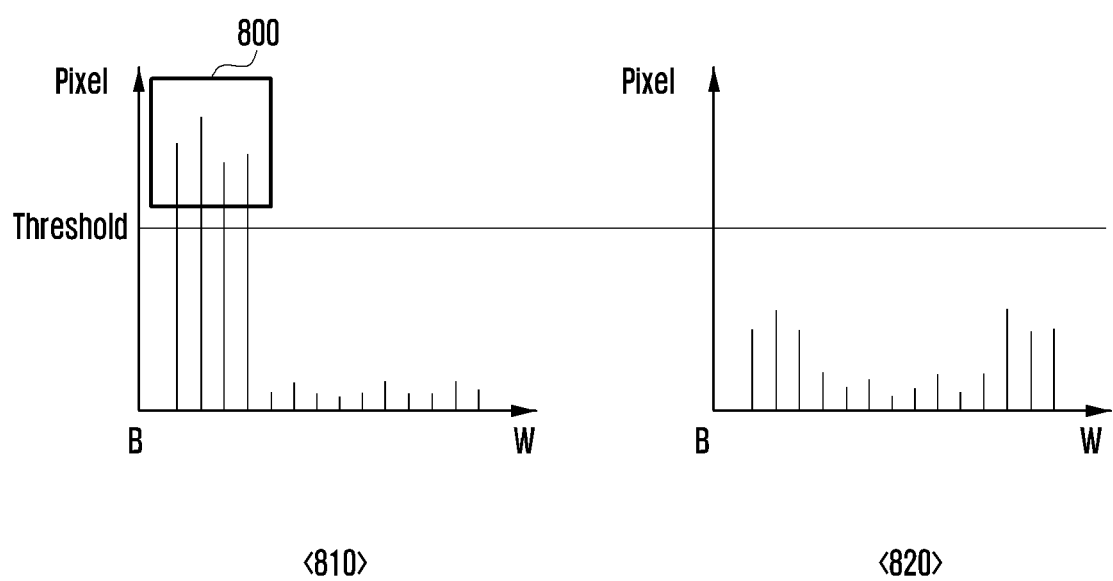
FIG. 8 is a diagram illustrating an example operation of blocking a verified fingerprint according to various example embodiments of the present disclosure.

FIG. 8 is an example of histogram performing the black/white image processing operation on the respective blocks divided depending on the image blocking according to various example embodiments of the present disclosure.

Referring to FIG. 8, the processor 210 may block one image verified by the fingerprint sensor 240N into the plurality of blocks. Further, the processor 210 may perform the black/white image processing operation on the respective blocks that are blocked. The black/white image processing operation may be an operation of dividing the fingerprint verified by the fingerprint sensor 210 into white and black depending on the brightness difference. FIG. 8 illustrates the example of the histogram for the black/white image processing.

According to various example embodiments of the present disclosure, the processor 210 may generate the histogram by block (per block). The x axis of the histogram may be an axis for dividing white and back and may be divided into black (B) and white (W). For example, as the number of pixels corresponding to B shown in the histogram is increased, the pixel may include more black, and as the number of pixels corresponding to W shown in the histogram is increased, the pixel may include more white. The y axis may be the number of pixels.

For example, a block <a> of FIG. 7 may be a block with which foreign substances are not stained, for example, on the fingerprint sensor. The processor 210 may perform the black/white image processing on a valley and a ridge of a fingerprint of the block <a>. The processor 210 may generate histogram <820> based on the block <a>.

Since the block <a> is a block in which valleys and ridges of a fingerprint are evenly distributed, the histogram <820> may be shown by a similar bar graph in which B corresponding to black and W corresponding to white do not exceed a threshold.

Alternatively, the processor 210 may perform the black/white image processing on block <b> of FIG. 7. The processor 210 may generate histogram <810> of FIG. 8 based on the black/white image processing operation.

Referring to FIG. 5A, the processor 210 may verify the fingerprint contact region based on the black/white image processing information in operation 511. The fingerprint contact region may be the surface of the electronic device and a relatively more protruding region (ridge) of the user's fingerprint and may be represented by black.

The processor 210 may check whether the fingerprint contact region is larger than the set threshold in operation 513. The set threshold value may be any value set to determine whether the fingerprint contact region determined based on the black/white image processing information is stained with foreign substances. For example, the set threshold may be the number of black pixels. When the fingerprint contact region exceeds the threshold value, for example, when the number of black pixels exceeds the threshold value, the processor 210 may determine that the fingerprint contact region is stained with foreign materials.

For example, referring to FIG. 7, the processor 210 may determine that the block <b> is a result of the fingerprint sensor being stained with foreign substances. The whole of the block <b> of FIG. 7 may be represented by black since the block <b> is a result of the fingerprint sensor being stained with foreign substances. As such, the operation of representing the block <b> by black may be performed by the black/white image processing operation of generating a histogram as illustrated in FIG. 8.

Referring to <810> of FIG. 8, the processor 210 can confirm that the number of the black pixels 800 displayed in the histogram generated by the black and white image processing operation of the block <b> is equal to or more than the set threshold.

For example, when foreign substances (for example, water, sweat, dust, etc.) are stained on the user's finger, the valley of the fingerprint may be filled. As the valley of the fingerprint is filled, the processor 210 may not accurately verify the fingerprint corresponding to the block <b>. For example, the processor 210 may verify the pixels corresponding to the block <b> as the block pixel. By doing so, the histogram for the block <b> may be shown as a histogram in which a large number of pixels are distributed in black like <810>.

Referring back to FIG. 5A, the processor 210 may determine whether the fingerprint contact regions for each block exceed the threshold. When the fingerprint contact region exceeds the threshold in operation 513, the processor 210 may disregard the block in which the fingerprint contact region exceeds the threshold value in operation 517. For example, the block in which the fingerprint contact region exceeds the threshold may be a block stained with foreign substances.

When the fingerprint contact region is equal to or less than the threshold in the operation 513, the processor 210 may verify the block having the fingerprint contact region that is equal to or less than the threshold as a valid region in the operation 517. For example, the block in which the fingerprint contact region is equal to or less than the threshold may be a block that is not stained with foreign substances.

Figure 9A:
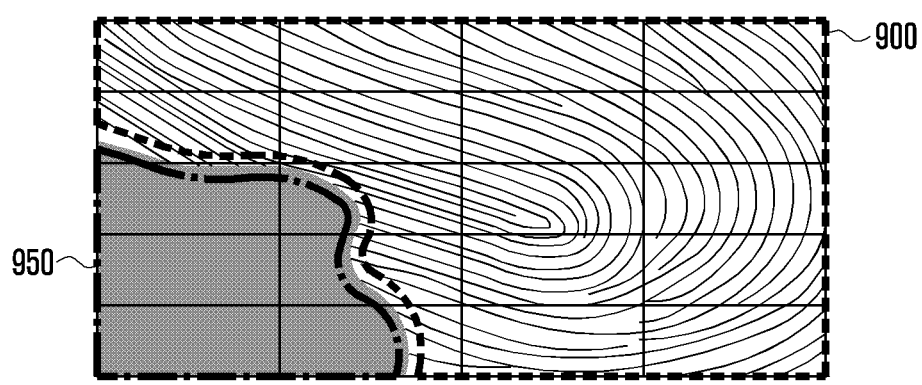
FIGS. 9A and 9B are diagrams illustrating an example of a verified fingerprint according to various example embodiments of the present disclosure.
Figure 9B:
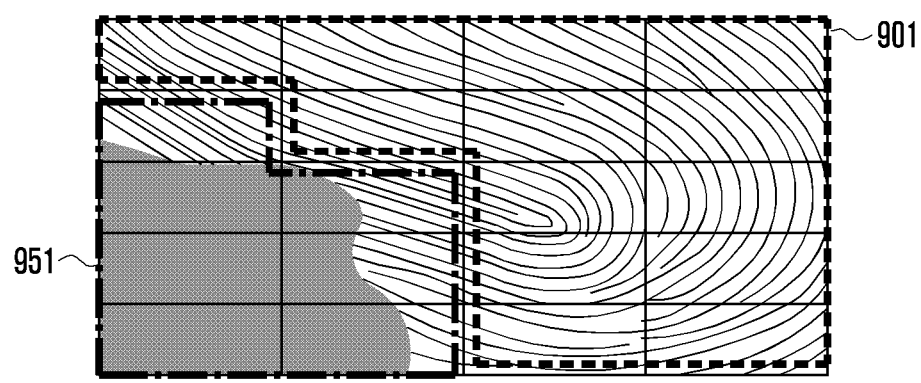

FIGS. 9A and 9B are diagrams illustrating an example of a verified fingerprint according to various example embodiments of the present disclosure.

Referring to FIG. 9A, the processor 210 may divide the blocks in which the fingerprint contact region is equal to or less than the threshold and may integrate the blocks into one region to display the blocks. The region that is integrated into one region and displayed may be a valid region 900. The processor may verify the region that is integrated into one region and displayed as the valid region 900.

According to various example embodiments, when the user's finger is stained with foreign substances (for example, water, sweat, dust, etc.), the processor 210 may verify the rest of the region other than a region 950 stained with foreign substances as the valid region 900.

According to another embodiment of the present disclosure, the processor 210 may divide the blocks resulting from a part of the finger stained with foreign substances and the blocks resulting from a part of the finger not stained with foreign substances per block. Referring to FIG. 9B, the processor 210 may verify the blocks resulting from a part of the finger stained with foreign materials as one set (group). The processor 210 may group the blocks stained with foreign substances and verify the blocks as a block group 951 stained with foreign substances. Further, the processor 210 may verify the blocks not stained with foreign substances as one set (group) and may group the blocks not stained with foreign substances and verify the blocks as a block group 901 not stained with foreign substances. The processor 210 may divide the block group 951 stained with foreign substances and the block group 901 not stained with foreign substances per block and verify the block group 951 and the block group 901.

According to another example embodiment of the present disclosure, the processor 210 may also divide the blocks stained with foreign substances and the blocks not stained with foreign substances based on how much the blocks are stained with foreign substances. For example, in the state in which a reference value is determined, the processor 210 may also verify the blocks as the blocks stained with foreign substances when the occupied ratio of foreign substances in the blocks exceeds the reference value. Further, the processor 210 may also the blocks as the blocks not stained with foreign substances when the occupied ratio of foreign substances in the blocks is equal to or less than the reference value.

After the operations 515 and 517 are performed, it may be determined whether the ratio occupied by the valid region exceeds the set ratio. The following operations will be described with reference to FIG. 5B.

Referring to FIG. 5B, in operation 519, the processor 210 may determine whether the ratio occupied by the valid region exceeds the set ratio. The processor 210 may set the ratio based on the ration occupied by the valid region. For example, the ratio may be a minimum area ratio of the valid region for the processor 210 to determine whether the fingerprint of the portion verified as the valid region matches the user's fingerprint. The ratio may also be set by a user and may also be set by a developer.

When the ratio occupied by the valid region exceeds the set ratio in operation 519, the processor 210 may compare the fingerprint of the portion verified as the valid region with the fingerprint stored in the memory 230 in operation 521.

In operation 523, the processor 210 may determine whether the fingerprint of the portion verified as the valid region matches the fingerprint stored in the memory 230. The processor 210 may store verifying fingerprints in the memory 230. Further, the processor 210 may determine whether the fingerprint of the portion verified as the valid region matches the user fingerprint stored in the memory 230. The valid region may be the region not stained with foreign substances by the operation 515 as described with reference to FIG. 5A. For example, the valid region may block the fingerprint verified by the processor 210 into a plurality of blocks, and may be a region that includes blocks less than the threshold from which the blocks in which a black pixel value is equal to or more than the threshold among the plurality of blocks are ruled out by the black/white image processing operation.

When the fingerprint verified as the valid region matches the user's fingerprint stored in the memory 230 in the operation 523, the processor 210 may determine a security level based on the ratio occupied by the valid region in operation 525. Here, the security levels may be differently set per application. For example, the processor 210 may differently set the security levels per application by the user or the application developer. In the case of applications of which security is important, the security processor 210 may set the security level to be high. The security level may be configured in a plurality of steps.

According to an example embodiment of the present disclosure, in the case of applications (applications having a high security level) of which security is important, the fingerprint verifying function may be turned off in consideration of the problem that the fingerprint verifying function is mal-functional.

According to an example embodiment of the present disclosure, the processor 210 may divide a security level into plurality and may differently set the area ratio of the valid region corresponding to the security levels divided into plurality. For example, a lock screen function that is a frequently used application may be set to be security level 1, gallery and message application including personal information may be set to be security level 2, and finance and payment application requiring a high security level may be set to be a security level 3. The security level 1 may set the area ratio of the valid region to be 50%, the security level 2 may set the area ratio of the valid region to be 80%, and the security level 3 may set the area ratio of the valid region to be 100%.

As described above, the processor 210 may confirm the security levels of functions (functions corresponding to applications) of which the execution is requested when verifying the fingerprint and determine whether the valid region corresponding to the verified fingerprint satisfies the area ratio of the valid region corresponding to the security level preset in application.

Figure 10:
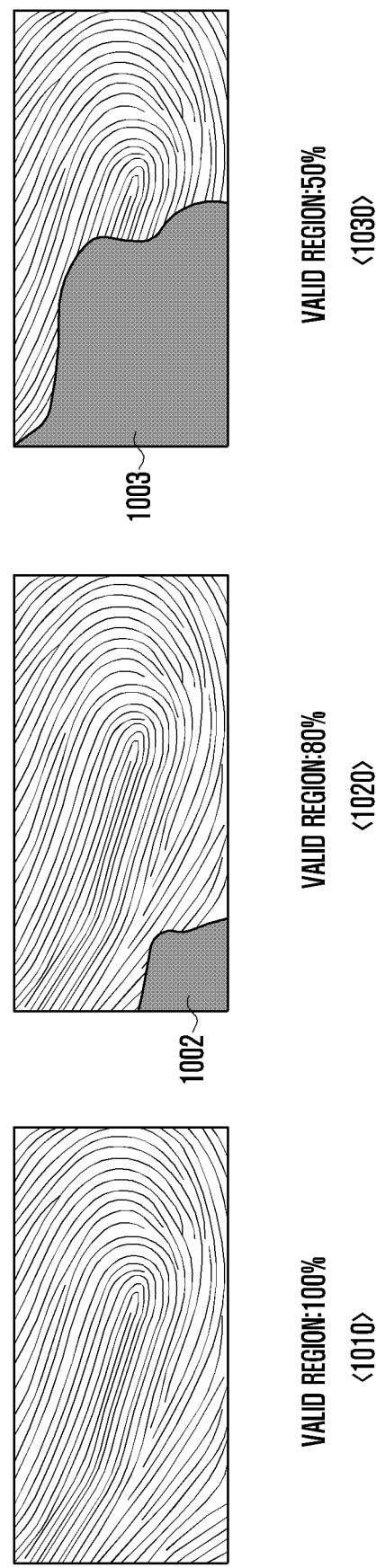
FIG. 10 is diagram illustrating an example operation of determining an area ratio of an effective region according to various example embodiments of the present disclosure.

FIG. 10 is a diagram illustrating an example operation of determining an area ratio of an effective region according to various example embodiments of the present disclosure.

Referring to FIG. 10, when the area ratio of the valid region is 100% <1010>, the processor 210 may completely verify the user's fingerprint corresponding to the valid region. The <1010> may be the fingerprint data acquired by the fingerprint sensor from a finger not stained with foreign substances.

When the area ratio of the valid region is 80% like <1010>, the processor 210 may verify 80% of the user's fingerprint corresponding to the valid region. The processor 210 may disregard a region 1002 in which the fingerprint contact area is equal to or more than the threshold by the foregoing black/white image processing operation.

When the area ratio of the valid region is 50% <1030>, the processor 210 may verify 50% of the user's fingerprint corresponding to the valid region. The processor 210 may disregard a region 1003 in which the fingerprint contact area is equal to or more than the threshold by the foregoing black/white image processing operation.

According to an example embodiment of the present disclosure, the processor 210 may determine the area of the valid region when verifying the fingerprint image to determine how much the valid region is occupied in the whole fingerprint image.

Referring to FIG. 5B, when the ratio occupied by the valid region does not exceed the set ratio in the operation 519, the processor 210 may display an error in operation 529. Further, when the processor 210 does not match the fingerprint of the portion verified as the valid region with the stored fingerprint in the operation 523, the processor 210 may display an error in operation 529. For example, the error may be information displayed on the display 260 (for example: message "dry hands") in a pop up form. Alternatively, the error may also output an alarm sound to a speaker (not illustrated). Alternatively, the processor 210 may also display a pop up "fingerprint mismatches".

According to an example embodiment of the present disclosure, when sensing the execution request of the finance application having a high security level, the processor 210 may display a pop up that requests removal foreign substances from hands and performs a retry and a pop up that the fingerprint mismatches if the valid region is not 100%.

According to an example embodiment of the present disclosure, the processor 210 may determine the security level based on the ratio occupied by the valid region in the operation 525. In operation 527, the processor 210 may perform the function after the fingerprint verification based on the determined security level. The ratio occupied by the valid region may digitalize how much the area of the valid region is occupied based on the image obtained by performing the image processing on the fingerprint. The processor 210 may set a plurality of security levels based on the area ratio occupied by the valid region and may determine the security level depending on the area ratio occupied by the confirmed valid region of the received fingerprint data.

According to an example embodiment of the present disclosure, when the area of the valid region of the verified fingerprint occupies at least 50% or more and is less than 80%, the processor 210 may determine application as the security level 1 and perform a function corresponding to 50% or more of the area of the valid region. For example, as the function corresponding to 50% or more of the area of the valid region, an unlock function of an electronic device may be set.

According to an example embodiment of the present disclosure, the processor 210 may also perform the application (for example, weather application) corresponding to 50% or more of the valid region while performing the unlock function of the electronic device.

According to another example embodiment of the present disclosure, when the area of the valid region of the verified fingerprint occupies 80% or more and is less than 100%, the processor 210 may determine application as the security level 2 and perform a function corresponding to 80% or more of the area of the valid region. For example, the function corresponding to 80% or more of the valid area may be the message and gallery application and the function (for example, release the unlock screen) of the security level 1 lower than the security level 2 may also be performed.

According to another example embodiment of the present disclosure, when the area of the valid region of the verified fingerprint occupies 100%, the processor 210 may determine application as the security level 3 and perform a function corresponding to 100% or more of the area of the valid region. When the area of the valid area is 100%, all the functions of the electronic device may be permitted to be performed.

Figure 11:
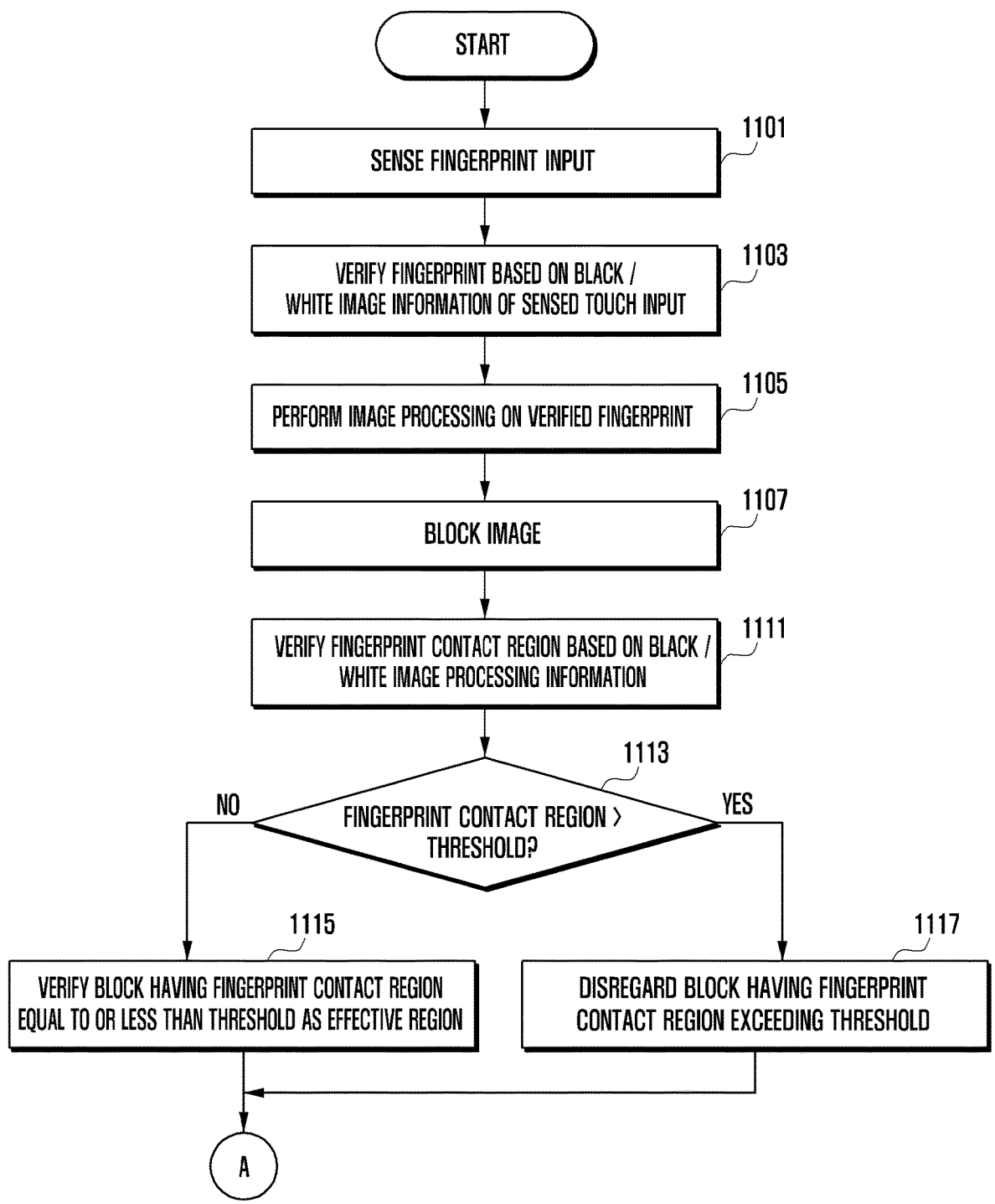
FIG. 11 is a flowchart illustrating an example operation of verifying a fingerprint according to another example embodiment of the present disclosure.

FIG. 11 is a flowchart illustrating an example operation of verifying a fingerprint according to another example embodiment of the present disclosure.

Referring to FIG. 11, the processor 210 may sense the fingerprint input of the user using the fingerprint sensor (fingerprint sensor 240N of FIG. 2) in operation 1011. When the fingerprint input is generated, the processor 210 may receive data depending on the fingerprint input. The data depending on the fingerprint input may represent the coordinates, pressure, or the like of the fingerprint input and may be data comprising a binary number of 0 and 1. The data depending on the fingerprint input may include black/white information. As the data depending on the fingerprint input includes the black/white information, the processor 210 may block (divide) the fingerprint image from which the image processing suffers (operation 507 of FIG. 5A) and may not perform the operation (operation 509 of FIG. 5A) of performing the black/white image processing on each block. For example, when the black/white information is included in the input of the user's fingerprint, the processor 210 may also remove the operation of performing the black/white image on the input user's fingerprint.

According to an example embodiment of the present disclosure, the processor 210 may primarily verify the input of the user's fingerprint to execute the Internet application. Further, the processor 210 may sense the fingerprint input request for executing payment application during the execution of the Internet application.

The processor 210 may verify the fingerprint based on the black/white image information of the sensed touch input in operation 1103 and perform the image processing on the verified fingerprint in operation 1105. Further, the processor 210 may block (divide) the processed image in operation 1107. Here, the blocking may include making the verified fingerprint into a block (a kind of grouping) by binding the verified fingerprint by pixel.

The operation of blocking, by the processor 210, the verified fingerprint by performing the image processing on the verified fingerprint may be an operation performed to confirm the region corresponding to the valid region in the verified fingerprint. Further, the processor 210 may compare the image with the fingerprint information stored in the memory 230 in a predetermined area unit.

Operations 1111 to 1117 (e.g., operation after the blocking) are the same as the operations 511 to 517, and therefore the description of the operations 1111 to 1117 will be omitted. Further, the operation after the operations 115 and 1117 may be replaced with the operations 519 to 529 of FIG. 5B.

According to the foregoing embodiment of FIG. 11, since the fingerprint image (data) corresponding to the fingerprint verified by the fingerprint sensor 260N includes the black/white information, the processor 210 may remove the black/white image processing operation on the fingerprint image. The processor 140 may more quickly perform the fingerprint verifying function as the performance of the black/white image processing operation on the fingerprint image is removed.

The method for verifying a fingerprint according to various embodiments of the present disclosure may include receiving the fingerprint data of the user using the fingerprint sensor; analyzing the fingerprint data to determine whether at least a part of the fingerprint data is not usable due to the fingerprint being at least partially covered with external materials; and at least partially comparing a part of the received fingerprint data with the fingerprint data stored in the memory based on the analyzed fingerprint data.

The analyzing the fingerprint data according to various example embodiments of the present disclosure may include: dividing the fingerprint data into a plurality of data sets; and determining whether at least one of the plurality of data sets is not usable due to the fingerprint being at partially stained with external materials.

The analyzing the fingerprint data according to various example embodiments of the present disclosure may include: determining whether at least one of the plurality of data sets corresponds to the set threshold or more; and determining that the at least data set is at least partially covered with external materials when the data set is equal to or more than the set threshold.

The method for verifying a fingerprint according to various example embodiments of the present disclosure may further include: binding at least a part of the image data by pixel to group the image data into the plurality of blocks, depending on whether the data set is based on a part of a finger at least partially covered with external materials.

The method for verifying a fingerprint according to various example embodiments of the present disclosure may further include: generating histograms for the at least one data set, in determining whether the at least one of the plurality of data sets is based on a part of a finger at least partially covered with external materials.

The method for verifying a fingerprint according to various example embodiments of the present disclosure may further include: setting a plurality of security levels based on the applications stored in the memory; and determining the set security level based on the area ratio occupied by the portion where the fingerprint may be confirmed in the image data.

The method for verifying a fingerprint according to various example embodiments of the present disclosure may further include: executing a function of application corresponding to the security level.

The method for verifying a fingerprint according to various example embodiments of the present disclosure may further include: removing the operation of performing the black/white processing on the fingerprint data.

According to various example embodiments, at least some of devices (for example: modules or functions thereof) or methods (for example: operations) may be implemented as instructions stored in computer-readable storage media in, for example, a form of programming modules. When the instructions are executed by at least one processor, the at least one processor may perform the functions corresponding to the instructions. The computer-readable storage media may be, for example, the memory. At least some of the programming modules may be implemented (for example: executed) by, for example, the processor. At least some of the programming modules may include, for example, modules, programs, routines, sets of instructions, processes, or the like to perform at least one function.

The computer-readable recording medium may include magnetic media such as a hard disk, a floppy disk, and a magnetic tape, optical media such as a compact disc read only memory (CD-ROM), a digital versatile disc (DVD), magneto-optical media such as a floptical disk, and hardware devices specially configured to store and execute program commands (for example: program modules) such as a read only memory (ROM), a random access memory (RAM), and a flash memory. In addition, examples of the program commands may include a high-level language code capable of being executed by a computer using an interpreter, or the like, as well as a machine language code made by a compiler. The above-mentioned hardware device may be constituted to be operated as at least one software module in order to perform the operations according to the present disclosure, and vice versa.

The module or the program module according to various embodiments may include at least one of the above-mentioned components, may not include some thereof, or may further include other additional components. The operation performed by the module, the programming module, or other components according to various embodiments may be executed by sequential, parallel, and repetitive methods. Further, some operations may be executed in another order or omitted or other operations may be added.

According to various embodiments of the present disclosure, the electronic device may improve the fingerprint verification rate even though the fingerprint is stained with the foreign substances.

Various example embodiments of the present disclosure described herein and in the accompanying drawings have been provided only as examples to aid in understanding the present disclosure and do not limit the scope of the present disclosure. Therefore, it is to be understood that in addition to the embodiments of the present disclosure, all modifications, variations or alternations derived based on a technical spirit of the present disclosure are included in the scope of the present disclosure.

What is claimed is:

1. An electronic device comprising:
   a housing;
   a display exposed through a part of the housing and disposed within the housing;
   a fingerprint sensor disposed at a portion of the housing or the display and coupled with the display;
   a processor electrically connected to the display and the fingerprint sensor; and
   a memory electrically connected to the processor,
   wherein the memory is configured to store instructions which, when executed, cause the processor to:
   detect fingerprint data through the fingerprint sensor,
   divide the detected fingerprint data based on at least one block,
   determine, if the number of black pixels corresponding to the at least one block is equal to or less than a threshold value, the at least one block as a valid region,
   determine a first group based on the at least one block corresponding to the valid region and
   perform, in response to matching the fingerprint data corresponding to the determined first group against fingerprint data stored in the memory, an authentication function based on the fingerprint data corresponding to the determined first group.

2. The electronic device of claim 1, wherein the instructions cause the processor to:
   divide the fingerprint data into a first area and a second area based on the at least one block, and
   perform the authentication function based on the first area of the fingerprint data.

3. The electronic device of claim 2, wherein the first area is an area where the detected fingerprint data can be identified.

4. The electronic device of claim 2, wherein the second area is an area being at least partially covered with an external material.

5. The electronic device of claim 4, wherein the external material includes a liquid.

6. The electronic device of claim 1, wherein the instructions cause the processor to:
convert the fingerprint data to at least one image, and
form the at least one image into a grid structure.

7. The electronic device of claim 1, wherein the instructions cause the processor to:
generate histograms based on the fingerprint data, and
perform the authentication function based on the generated histograms.

8. The electronic device of claim 1, wherein the instructions cause the processor to:
identify a ratio corresponding to the valid region based on the fingerprint data, and
determine at least one security level based on the ratio corresponding to the valid region.

9. The electronic device of claim 8, wherein the instructions cause the processor to:
perform at least one application function based on the determined at least one security level.

10. A method for authenticating a fingerprint, the method comprising:
detecting fingerprint data through a fingerprint sensor mounted in an electronic device;
dividing the detected fingerprint data based on at least one block;
determining, if the number of black pixels corresponding to the at least one block is equal to or less than a threshold value, the at least one block as a valid region;
determining a first group based on the at least one block corresponding to the valid region; and
performing, in response to matching the fingerprint data corresponding to the determined first group against fingerprint data stored in a memory, an authentication function based on the fingerprint data corresponding to the determined first group.

11. The method of claim 10, further comprising:
dividing the fingerprint data into a first area and a second area based on the at least one block; and
performing the authentication function based on the first area of the fingerprint data.

12. The method of claim 11, wherein the first area is an area where the detected fingerprint data can be identified.

13. The method of claim 11, wherein the second area is an area being at least partially covered with an external material.

14. The method of claim 13, wherein the external material includes a liquid.

15. The method of claim 10, further comprising:
converting the fingerprint data to at least one image; and
forming the at least one image into a grid structure.

16. The method of claim 10, wherein the performing the authentication function comprising:
generating histograms based on the fingerprint data; and
performing the authentication function based on the generated histograms.

17. The method of claim 10, further comprising:
identifying a ratio corresponding to the valid region based on the fingerprint data, and
determining at least one security level based on the ratio corresponding to the valid region.

18. The method of claim 17, further comprising:
performing at least one application function based on the determined at least one security level.

* * * * *